United States Patent
Gollner (10) Patent No.: US 8,156,738 B2
(45) Date of Patent: Apr. 17, 2012

(54) HYDROSTATIC TRANSMISSION HAVING TWO AXIAL PISTON UNITS

(75) Inventor: Wilhelm Gollner, Neumunster (DE)

(73) Assignee: Sauer-Danfoss Inc., Ames, IA (US)

(*) Notice: Subject to any disclaimer, the term of this patent is extended or adjusted under 35 U.S.C. 154(b) by 973 days.

(21) Appl. No.: 12/141,318

(22) Filed: Jun. 18, 2008

(65) Prior Publication Data

US 2009/0020004 A1 Jan. 22, 2009

(30) Foreign Application Priority Data

Jul. 16, 2007 (DE) .......................... 10 2007 033 008

(51) Int. Cl.
*F16D 31/02* (2006.01)
*F01B 13/04* (2006.01)
*F01B 3/00* (2006.01)

(52) U.S. Cl. ............................... 60/492; 92/12.2; 91/505
(58) Field of Classification Search .................... 60/487, 60/492; 91/499, 504, 505; 92/12.2, 57, 71
See application file for complete search history.

(56) References Cited

U.S. PATENT DOCUMENTS 3,630,026 A * 12/1971 Ifield .............................. 60/492
2007/0277520 A1* 12/2007 Gollner ......................... 60/492

FOREIGN PATENT DOCUMENTS

DE 10 2006 025 347 12/2007

* cited by examiner

*Primary Examiner* — Michael Leslie
(74) *Attorney, Agent, or Firm* — Zarley Law Firm, P.L.C.

(57) ABSTRACT

The invention relates to a hydrostatic transmission having two bent axis- or swashplate-type axial piston units which are operated alternately as a pump and as a motor, with the two axial piston units being adjustable together with a pivotable dual yoke or by means of a pivotable dual swashplate. In order to minimize the dead volumes of the two axial piston units, the rotational axes of the two axial piston power units are offset with respect to the pivot axis of the dual yoke or of the swashplate by a magnitude such that, at all pivot angles, the power unit pistons, at dead center, are located in the direct vicinity of the bore end of the cylinder block.

8 Claims, 10 Drawing Sheets

HYDROSTATIC TRANSMISSION HAVING TWO AXIAL PISTON UNITS

BACKGROUND OF THE INVENTION

The invention relates to a hydrostatic transmission having two bent axis-type axial piston units which are operated alternately as a pump and as a motor, with the two axial piston units being mounted in a common pivotable dual yoke and being pivotable together with the latter, as per the preamble of Claim 1.

The invention also relates to a hydrostatic transmission having two bent axis-type axial piston units which are operated alternately as a pump and as a motor, with the two axial piston units having a common pivotable dual swashplate with contact faces which are inclined with respect to the shaft of the respective axial piston unit to different extents, as per the preamble of Claim 4.

Hydrostatic transmissions are the subject matter of the prior application DE 10 2006 025 347. They are used in particular in power-split transmissions.

Bent axis units have in each case a cylinder drum which is mounted so as to be rotatable about its longitudinal central axis and which likewise have, distributed about their periphery, cylinder bores in which the pistons can move. In order to adjust the volume flow, the cylinder drum is pivotable about a pivot axis which runs transversely with respect to its rotational axis, as a result of which the longitudinal central axis of the cylinder drum forms an adjustable angle with the axis of the driveshaft. The pistons are articulatedly supported here on the drive flange of the shaft at an adjustable angle. The cylinder block is for this purpose held by a correspondingly designed, rotatable end housing which is for example formed in the manner of a yoke or by the end housing, is mounted on a fixed housing part and can be pivoted by means of a servo system.

Swashplate units have a rotating cylinder drum with pistons which are distributed about the periphery and which move in the cylinders and which are supported in a sliding fashion on a swashplate. The pivot angle of the swashplate can be adjusted by means of a servo system. With increasing pivot angle, the piston stroke in the cylinder bores, and therefore the volume flow, increase.

The above-mentioned prior application DE 10 2006 025 347 describes a simplified, compact design of a hydrostatic transmission which is composed in each case of a pump and a hydraulic motor which, in the case of the swashplate design, are adjusted by means of a dual swashplate which has in each case one separate contact face with a different angle of inclination with respect to the shaft axis for the displacement pistons of the two units. In the case of the bent axis design, a pivotable dual yoke is provided, to which the pump and hydraulic motor are likewise positively coupled, which are thereby controlled together. Here, the hydraulic motor strokes in each case from a maximum to the minimum pivot angle while the pump is stroked from the minimum to the maximum pivot angle.

Figure 1:
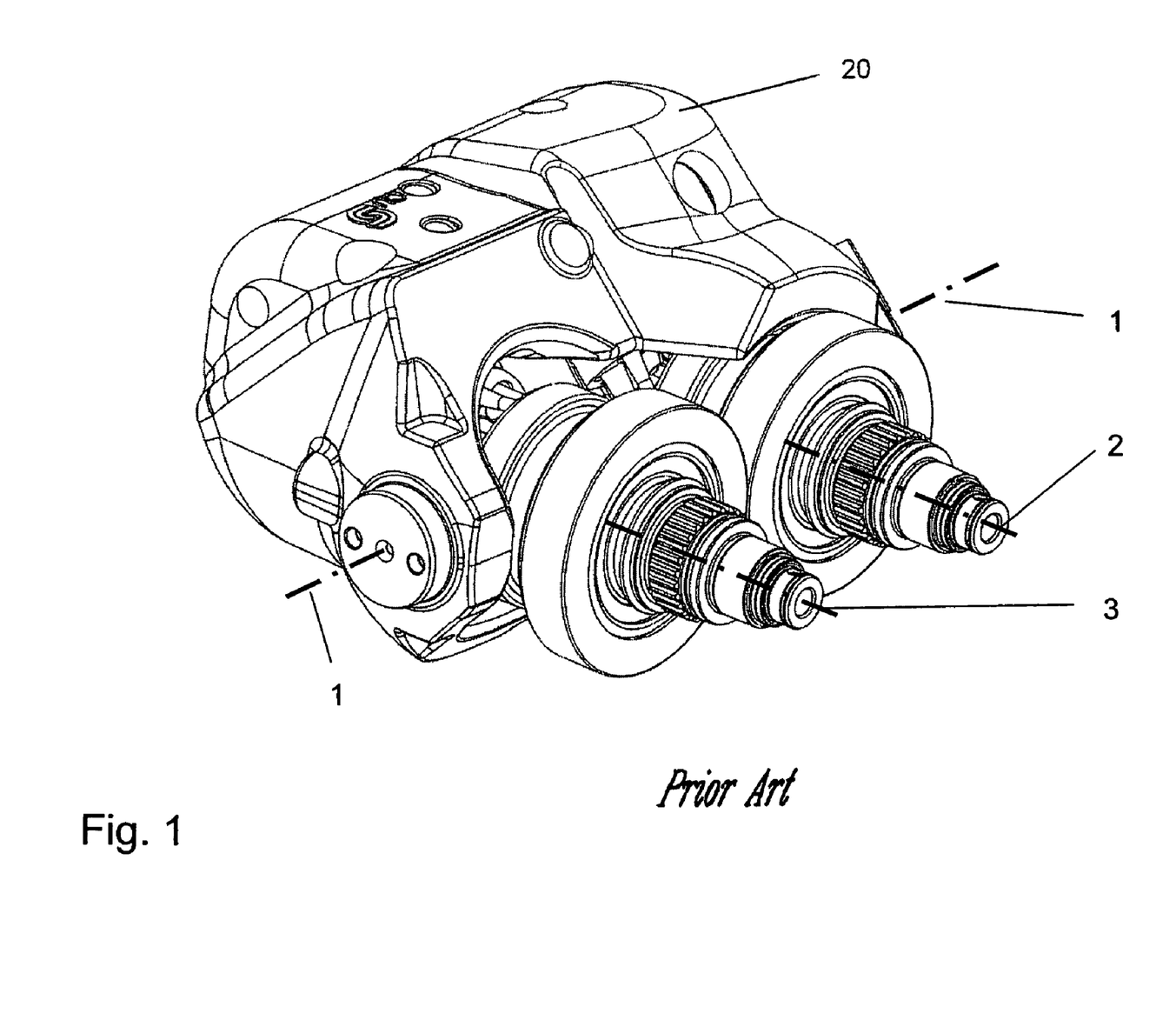
FIG. 1 is a perspective view of a prior art servo system.
Figure 2:
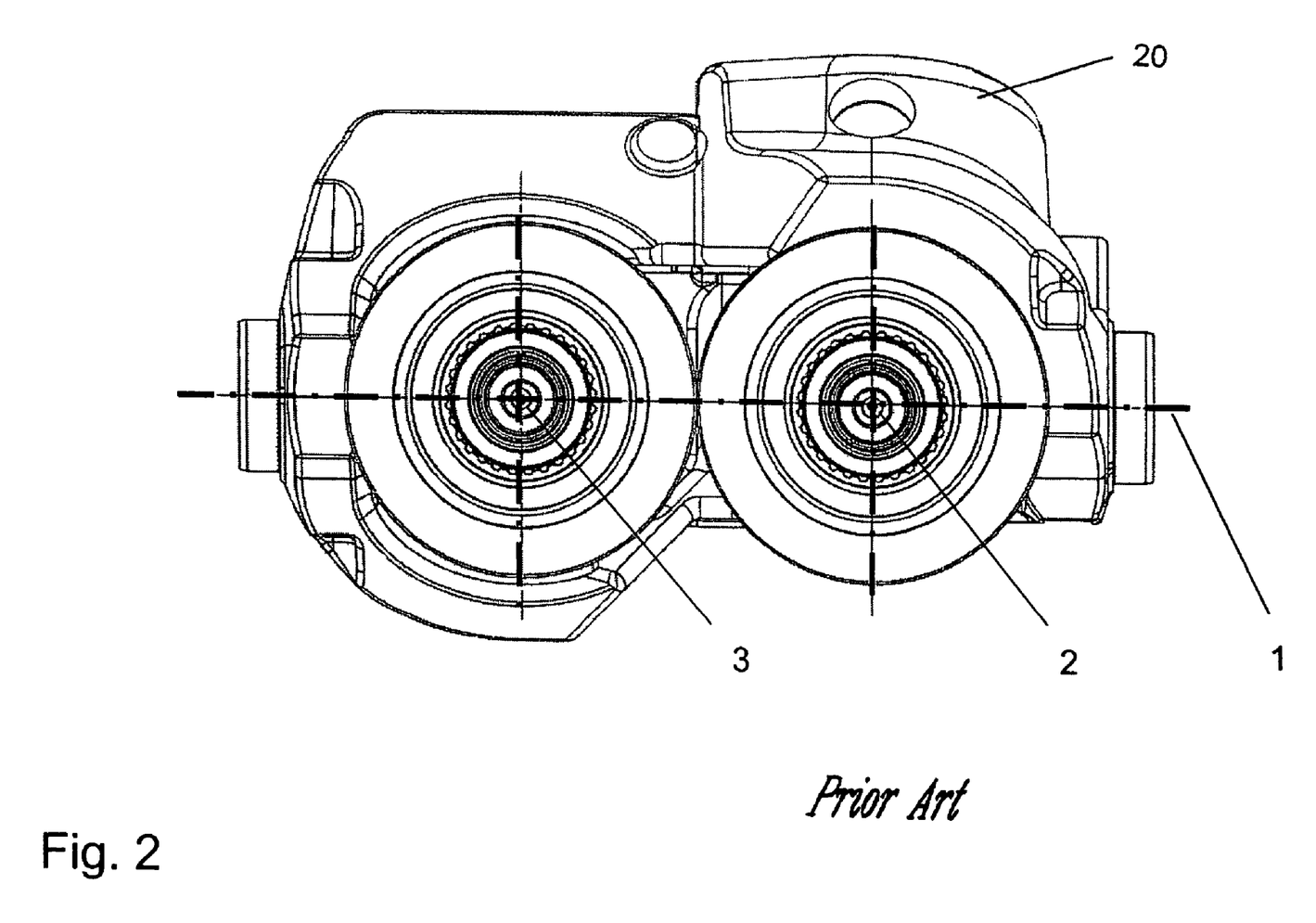
FIG. 2 is an end view of a prior art servo system.
Figure 3:
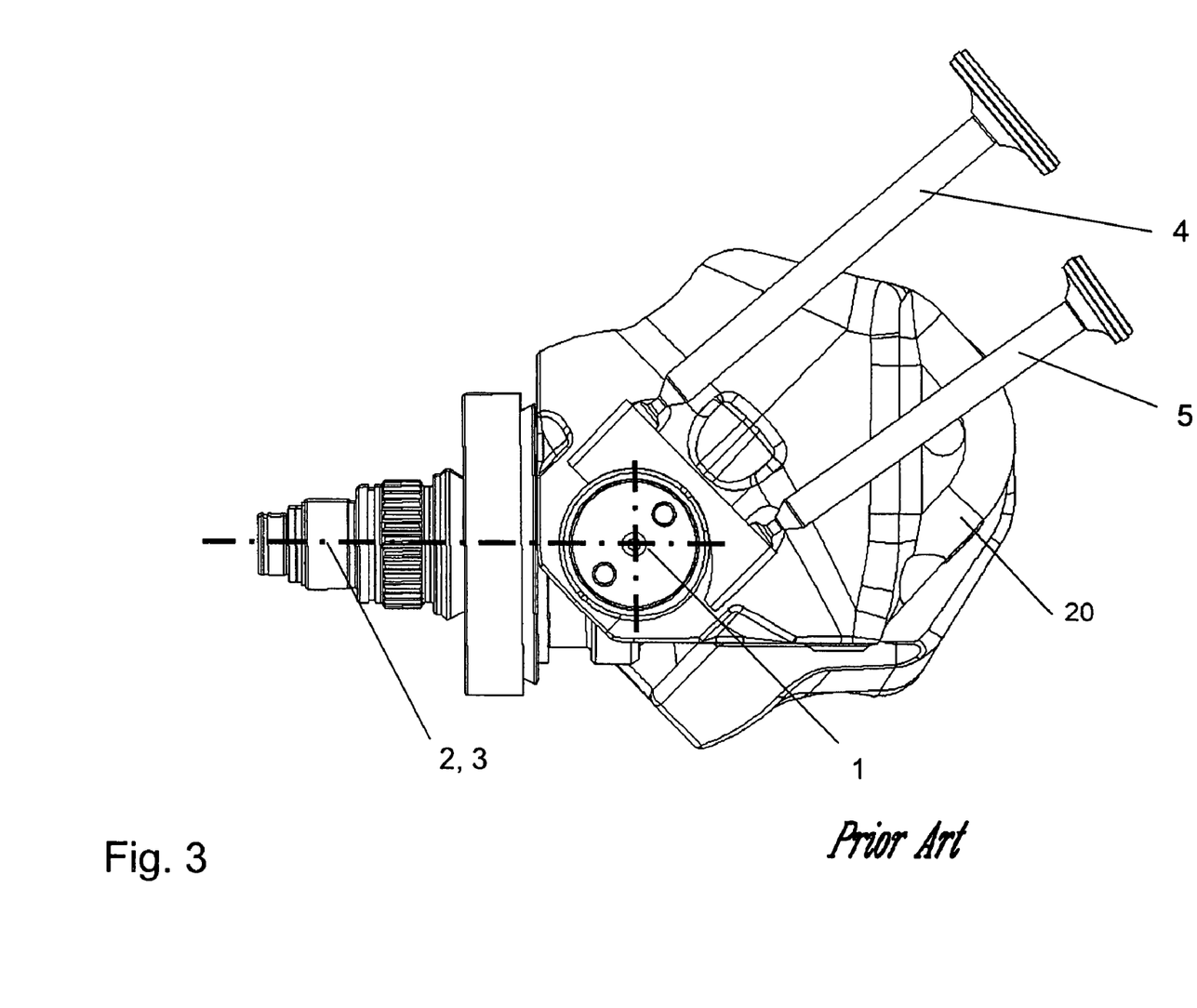
FIG. 3 is a side view of the servo pistons of a prior art servo system.

FIGS. 1 to 3 show said older system in a perspective illustration and in a front view and a side view. The two rotational axes 2, 3 of the shafts of the axial piston power units intersect the pivot axis 1 of the dual yoke 20 at right angles. All three axles lie in the same plane. Mounted in the dual yoke 20 are the cylinder blocks of the two units which, when the dual yoke 20 pivots, are likewise pivoted about the pivot axis 1. The side view in FIG. 3 also illustrates the servo pistons 4, 5 of the servo system which brings about the change in displacement. From this, it can be clearly seen that, with said arrangement of the pivot and rotational axes 1, 2, 3 on account of the given lever arms, it is possible to realize relatively low control torques, such that the servo pistons 4, 5 can be kept small.

Figure 4:
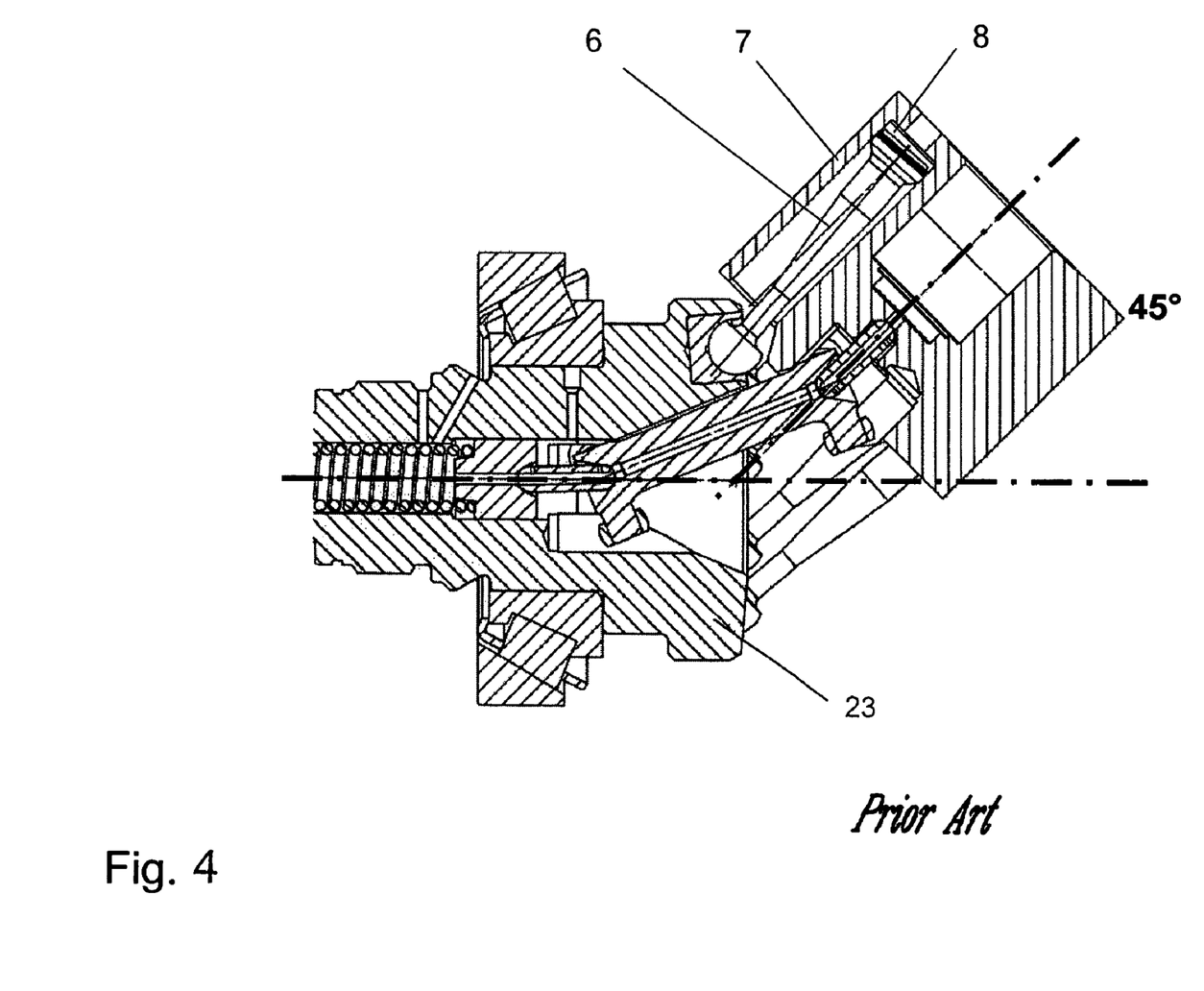
FIG. 4 is a sectional view of a prior art axial piston unit.

However, with said geometry of the pivot and rotational axes 1, 2, 3, it is necessary to accept a significant power loss which is caused substantially by decompression losses. This is explained in more detail on the basis of FIGS. 4 to 6. FIG. 4 shows a cross section through an axial piston unit at the maximum pivot angle of 45°. Here, the design can be such that the piston 6, in its end position, extends up to a short distance in front of the end of the piston bore in the cylinder block 7. The remaining space between the power unit piston 6 and the bore end is then at a minimum, such that the decompression volume also remains at a minimum. The remaining oil which is at high pressure is connected to the low pressure during the further rotation of the cylinder block 7 and expands in the low pressure. Since said space can be kept small at the maximum pivot angle, the decompression losses are low here.

Figures 5, 6:
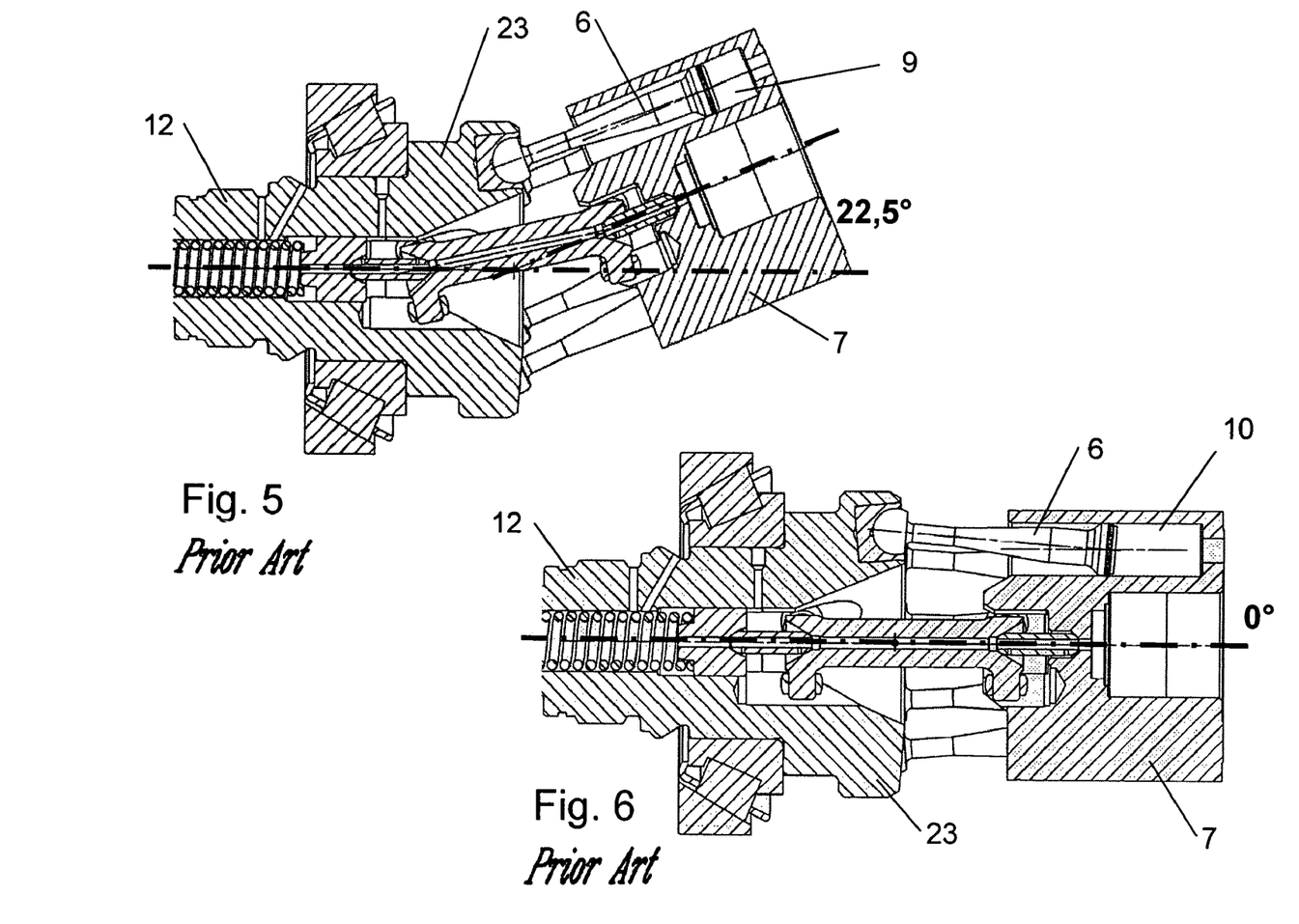
FIG. 5 is a sectional view of a prior art axial piston unit.
FIG. 6 is a sectional view of a prior art axial piston unit.

At a pivot angle of 22.5°, half of the maximum pivot angle, the piston 6 no longer reaches the base of the bore at dead centre. As shown in FIG. 5, the dead volume 9 is now enlarged considerably and is already 25% of the maximum displacement of the piston unit. At a pivot angle of 0°, as illustrated in FIG. 6, the dead volume 10 is then 50% of the maximum displacement. Here, especially, there are very high decompression losses which increase quadratically with pressure and, at a pressure of over 250 bar, are of very high significance. For example, the power loss of a 250 $cm^3$ pump at a pivot angle of 0° and at a rotational speed of 4000 rev/mm and a pressure of 400 bar is approximately 10 KW.

SUMMARY OF THE INVENTION

With the present invention, it is intended to create a hydrostatic transmission of the type described in the introduction with reduced power loss.

According to the invention, this is obtained in the case of a generic hydrostatic transmission having two bent axis-type axial piston units with a dual yoke in that the rotational axes of the two axial piston units are offset with respect to the pivot axis of the dual yoke by a magnitude such that, at all pivot angles, the pistons, at dead centre, are located in the direct vicinity of the bore end of the cylinder block. This results in an offset between the centre of rotation of the cylinder blocks and the respective driveshaft, as a result of which, for all pivot angles, the dead volume which is expanded from high pressure into the low pressure is at a minimum, which considerably reduces the power loss of the hydrostatic transmission.

Equally large axial piston units are preferably provided for the transmission, with the rotational axes of the two axial piston power units being offset with respect to the pivot axis of the dual yoke in each case by the same magnitude such that the torques exerted by the two axial piston power units on the dual yoke are compensating each other.

In an alternative refinement of the invention, axial piston power units of unequal size are provided, with the rotational axes of the two axial piston power units being offset with respect to the pivot axis of the dual yoke in each case by a different magnitude such that the torques exerted by the two axial piston power units on the dual yoke are predominantly compensating each other.

If the centre of rotation of the cylinder block is offset with respect to the driveshaft, the displacement pistons act on the dual yoke via a corresponding lever with a considerable torque. By means of the above-specified refinements, said forces are compensated, such that the associated servo system can remain of comparatively small dimensions.

In a generic hydrostatic transmission having two swashplate type axial piston units with a dual swashplate, the above-specified aim is achieved according to the invention in a similar way in that, in order to minimize the dead volumes of the two axial piston power units, the rotational axes of the two axial piston power units are likewise offset with respect to the pivot axis of the dual swashplate by a magnitude such that, at all pivot angles, the power unit pistons, at dead centre, are located in the direct vicinity of the bore end of the cylinder block.

Equal-sized power units are preferably used in the case of the swashplate design too. It is then possible, in order to completely compensate the occurring torques, in the same way as in the bent axis version, for the rotational axes of the two axial piston units to be offset with respect to the pivot axis of the dual swashplate in each case by the same magnitude such that the torques exerted by the two axial piston units on the dual swashplate are compensated. In the case that the axial piston power units are of unequal size, the rotational axes of the two axial piston units can be offset with respect to the pivot axis of the dual swashplate in each case by a different magnitude such that the compensation of the torques exerted by the two axial piston power units on the dual swashplate are at least optimized and the forces are predominantly compensated.

The mechanical coupling of the axial piston units in the dual yoke, or the coupling of the adjustment of the axial piston units by means of the dual swashplate, is preferably designed such that the motor is adjusted from the maximum to the minimum pivot angle when the pump is pivoted from the minimum to the maximum pivot angle. Dispensing the independent control for the two units results in a simplified, compact construction which brings with it a considerable cost reduction and higher reliability.

BRIEF DESCRIPTION OF THE DRAWINGS

Further features and advantages can be gathered from the description of the exemplary embodiments of the invention illustrated in the following figures, in which.

DETAILED DESCRIPTION OF THE PREFERRED EMBODIMENTS

Figure 7:
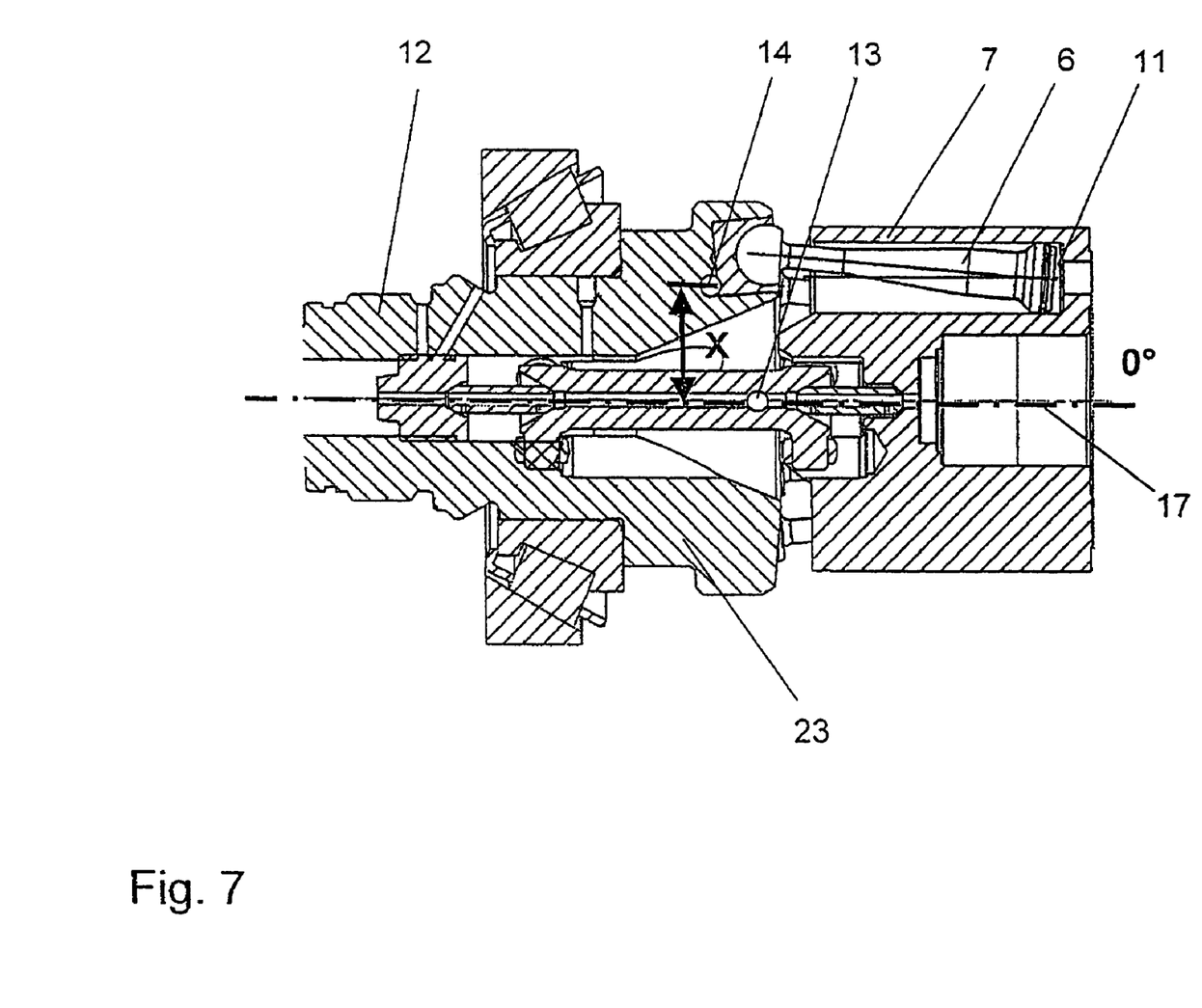
FIG. 7 shows the offset of the centre of rotation of the cylinder piston as per one exemplary embodiment of the invention with a dual yoke.

FIG. 7 illustrates, for a first bent axis-type exemplary embodiment, the resulting centre of rotation 14 for the cylinder block 7 in relation to the power unit shaft 12 when the rotational axis 17 is offset with respect to the pivot axis of the dual yoke. Said pivot axis is not illustrated in the figure which shows only one of the power units, and said pivot axis runs perpendicular to the shaft 12, but in a plane which is offset in parallel. As a result of said offset, the dead volume 11 is minimized even at a pivot angle of 0°. This results from the fact that the cylinder block 7 does not rotate about an (in this case virtual) point of intersection 13 of the rotational axis 17 with the pivot axis of the dual yoke, as in earlier systems in which the rotational and pivot axes lie in a plane.

As a result of the offset, although the dead volume is on the one hand minimized for all pivot angles, there are however also considerable disadvantages. Specifically, forces exerted by the drive piston 6 which is mounted in the drive flange 23 act via the lever arm x and very significantly increase the torques which are necessary for pivoting the cylinder block. The resulting increase in the servo piston forces by the factor 3 to 5 means that the servo system for a single power unit would have to be designed to be correspondingly stronger, would require a greater installation space and would entail higher costs.

Figure 8:
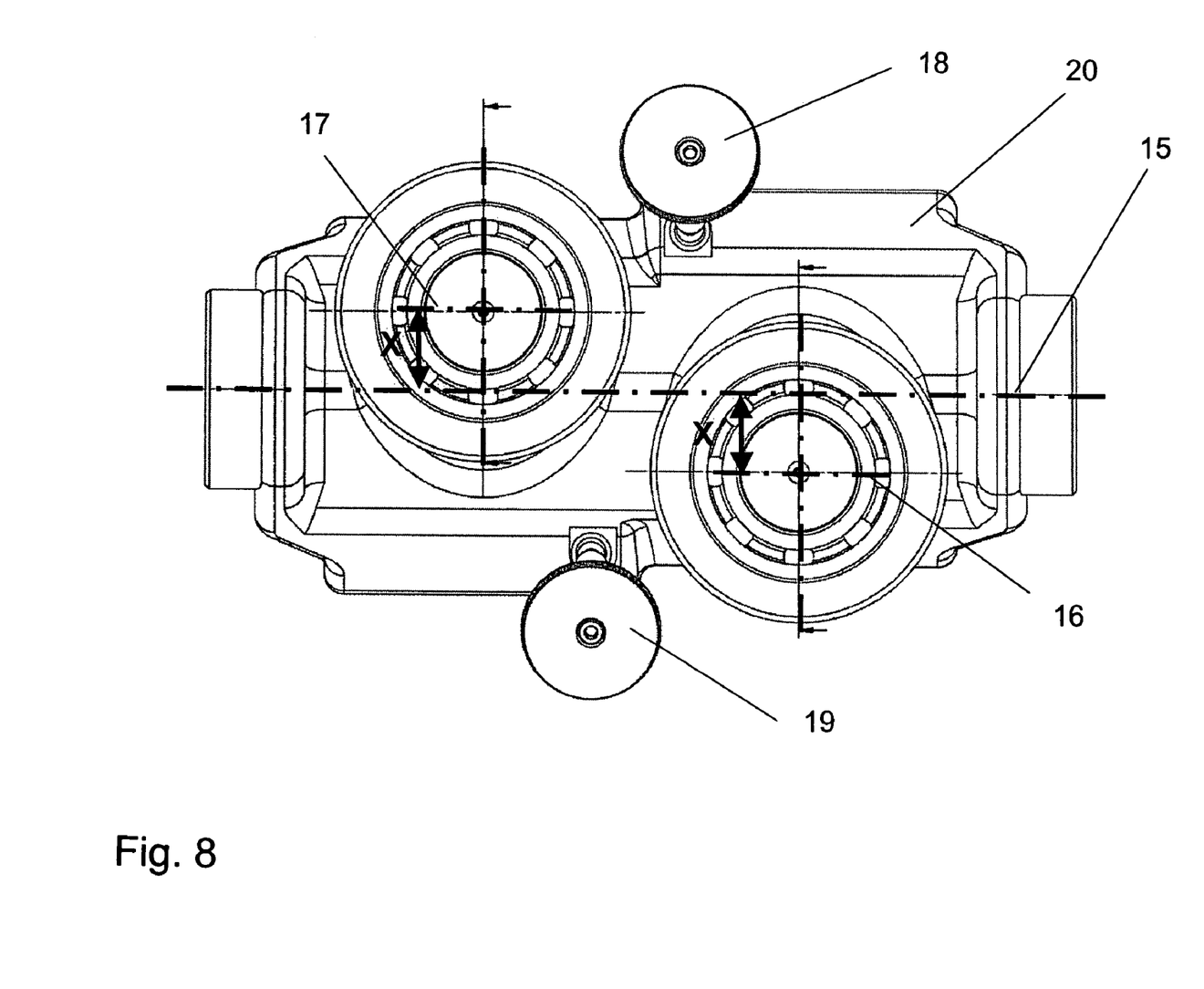
FIG. 8 shows the exemplary embodiment in a front view.

FIG. 8 illustrates an exemplary embodiment of the invention for bent axis-type axial piston units in a front view. The cylinder blocks of the two power units pivot together with the dual yoke 20 about the pivot axis 15. The rotational axes 16 and 17, which run perpendicular to the drawing plane, of the two axial piston units are in each case offset by the magnitude x with respect to the pivot axis 15 and lie in three parallel planes which are offset with respect to one another. In the illustrated example, the offset of the two axial piston power units takes place, proceeding from the pivot axis 15, in opposite directions by in each case the same magnitude x. In the case of equally large power units, this results not only in a minimization of the respective dead volumes for the entire pivot angle range, but also in complete compensation of the torques exerted by the drive piston on the dual yoke, such that the servo system with the servo pistons 18, 19 does not need to be enlarged. However, even if the two power units are of different sizes and require in each case different displacements "x", the torques are largely compensated. It is possible in any case to obtain optimum compensation by means of suitable individual dimensioning of the offset for the respective power unit.

Figure 9:
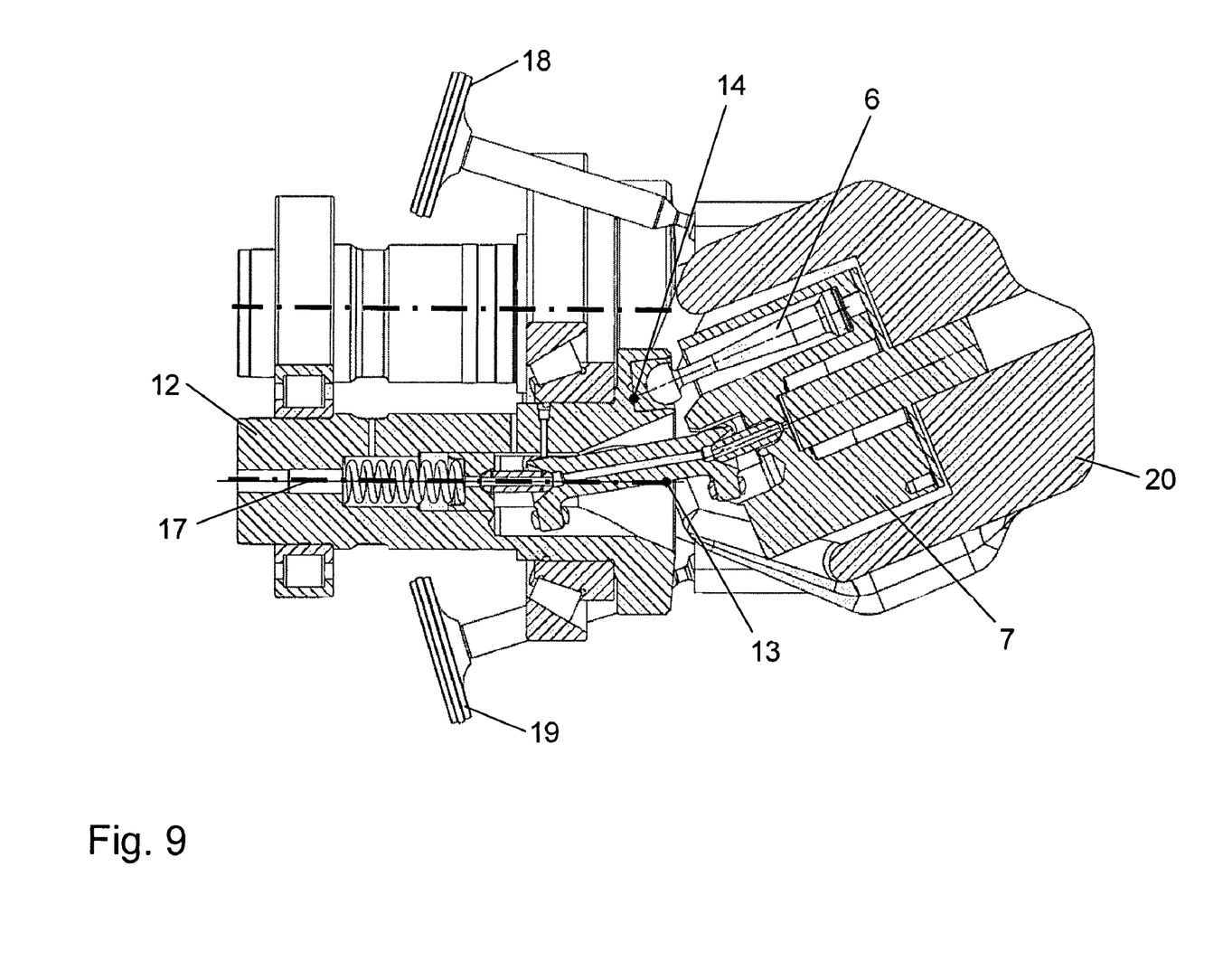
FIG. 9 shows the exemplary embodiment in section through the first axial piston unit.
Figure 10:
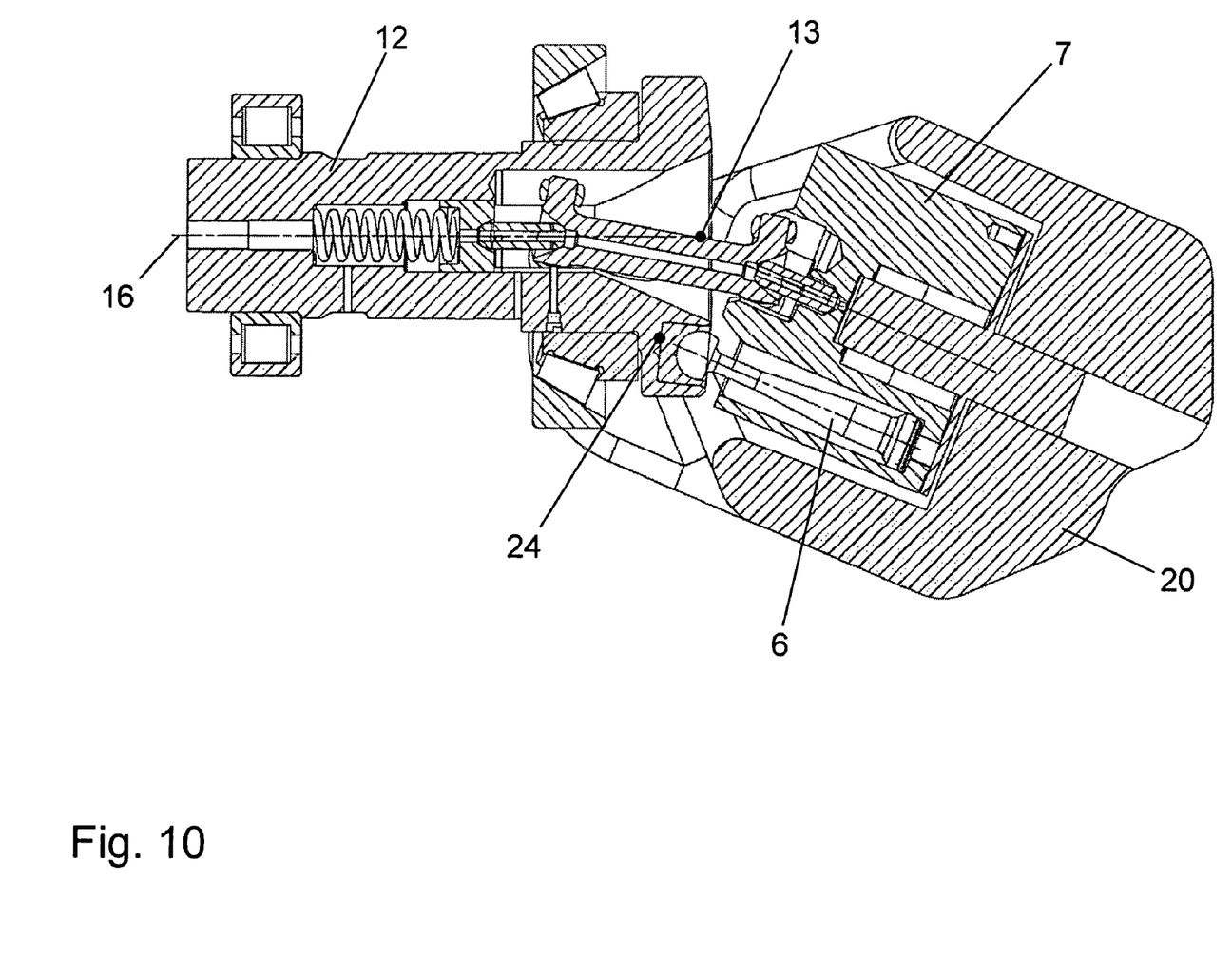
FIG. 10 shows the exemplary embodiment in section through the second axial piston unit.

FIGS. 9 and 10 show the exemplary embodiment with a double yoke in section through in each case one of the axial piston units. The two cylinder blocks 7 are retained in the dual yoke 20 and are pivoted together with the latter. The retention in the dual yoke is designed such that the hydraulic motor pivots from the maximum pivot angle, typically 45°, in the direction of 0° when the pump is pivoted from 0° to the maximum angle. The sections show the pump and the motor in their respective maximum pivoted position with respect to the rotational axis of the driveshaft 12. The offset of the respective rotational axes 16, 17 of the shafts 12 with respect to the pivot axis of the dual yoke 20 results in a centre of rotation 14, 24, which is correspondingly offset with respect to the driveshaft 12, of the respective axial piston unit. Said offset with respect to a centre of rotation which would result if the rotational axes 16, 17 were situated in a plane with the pivot axis of the dual yoke is illustrated in FIGS. 9 and 10 by the points 13 and 14 or 13 and 24 respectively.

Figure 11:
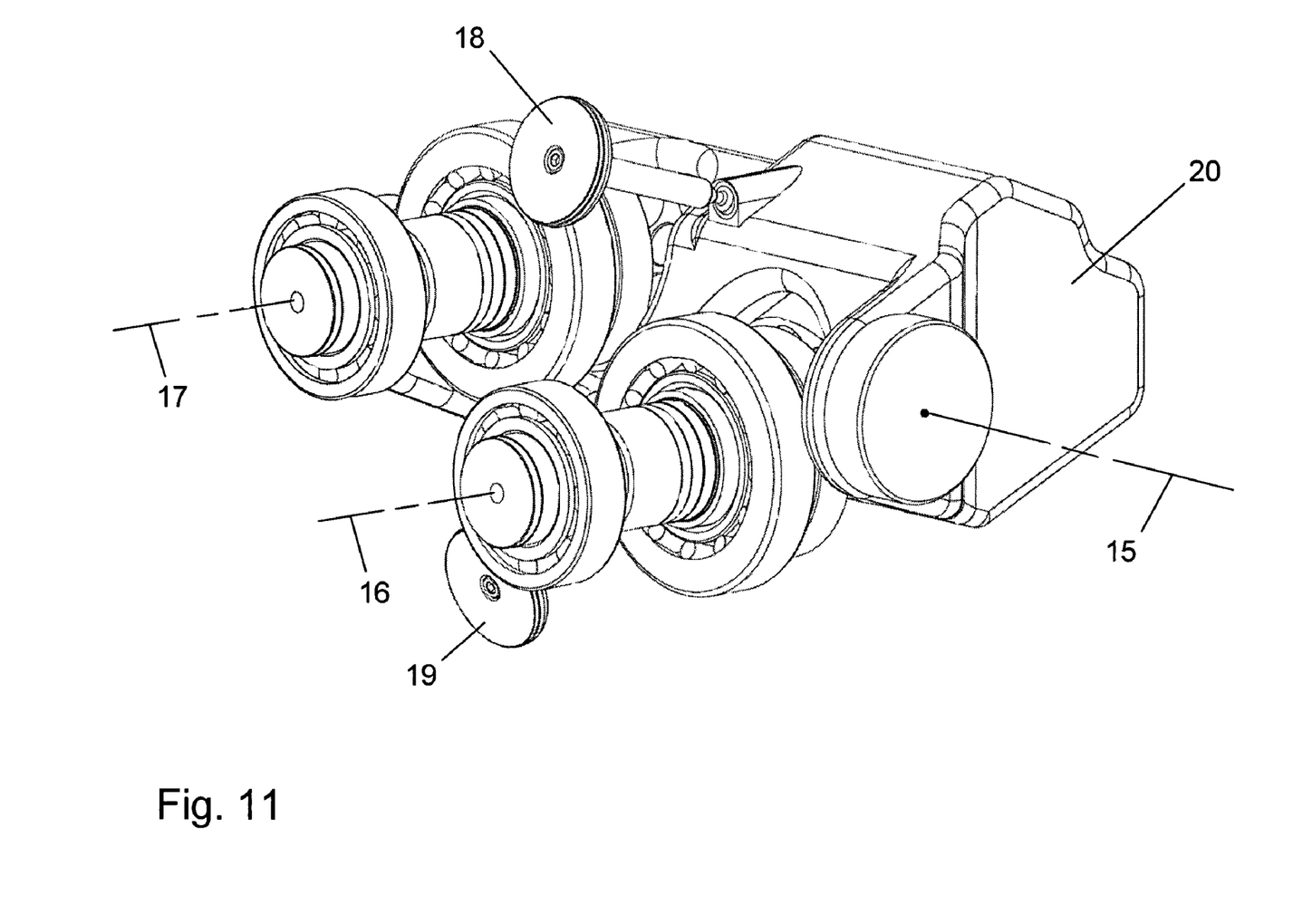
FIG. 11 shows the exemplary embodiment in a perspective view.

FIG. 11 shows a perspective view of the above-described exemplary embodiment with a dual yoke 20. The illustration shows the position of the pivot axis 15 and the rotational axes 16, 17, which are offset with respect to the pivot axis 15, of the driveshafts of the respective axial piston power units. The reference symbols 18 and 19 again denote the pistons of the servo system, by means of which the dual yoke is pivoted.

The invention with offset rotational and pivot axes can also be designed in the same way with hydrostatic transmissions which, of swashplate type, are filled with the dual swashplate described in DE 10 2006 025 347. In said embodiment, too, the axes of the swashplate units are offset with respect to the pivot axis of the dual swashplate such that the two units can be operated with a minimum dead volume over the entire adjustment range. Likewise, the high-pressure forces which act on the dual swashplate are again compensated if the offset of the two units is provided in each case opposite directions from the pivot axis of the dual swashplate. Said embodiment therefore also gets by with a servo system of relatively small dimensions.

Both bent axis type units with a dual yoke and swashplate systems with a dual swashplate therefore permit, in an ideal way, a displacement of the centre of rotation in order to minimize the dead volume while simultaneously compensating the forces which counteract a pivot angle control. This concept therefore leads to a considerable elimination of the decompression losses and a reduction in the power loss.

I claim:

1. Hydrostatic transmission having two bent axis axial piston units which are operated alternately as a pump and as a motor, with the two bent axis axial piston units being mounted in a common-pivotable dual yoke (20) and being pivotable together with the latter, characterized in that, in order to minimize the dead volumes (8, 9, 10, 11) of the two bent axis axial piston units, the rotational axes (16, 17) of the two bent axis axial piston units are offset with respect to a pivot axis (15) of the dual yoke (20) by a magnitude such that, at all pivot angles, power unit pistons (6), at dead centre, are located in the direct vicinity of a bore end of a cylinder block (7).

2. Hydrostatic transmission according to claim 1, in which the bent axis axial piston units are of equal size, characterized in that the rotational axes (16, 17) of the two bent axis axial piston units are offset with respect to the pivot axis (15) of the dual yoke (20) in each case by the same magnitude such that the torques exerted by the two bent axis axial piston units on the dual yoke (20) are compensated.

3. Hydrostatic transmission according to claim 1 characterized in that the rotational axes (16, 17) of the two bent axis axial piston units are offset with respect to the pivot axis (15) of the dual yoke (20) in each case by a different magnitude such that the torques exerted by the two bent axis axial piston units on the dual yoke (20) are compensated.

4. Hydrostatic transmission having two bent axis axial piston units which are operated alternately as a pump and as a motor, characterized in that, in order to minimize the dead volumes of the two bent axis axial piston units, rotational axes of the two bent axis axial piston units are offset with respect to a pivot axis by a magnitude such that, at all pivot angles, power unit pistons, at dead centre, are located in the direct vicinity of a bore end of a cylinder block.

5. Hydrostatic transmission according to claim 4, in which the bent axis axial piston units are of equal size, characterized in that the rotational axes of the two bent axis axial piston units are offset in each case by the same magnitude such that the torques exerted by the two bent axis axial piston units are compensated.

6. Hydrostatic transmission according to claim 4, characterized in that the rotational axes of the two bent axis axial piston units are offset in each case by a different magnitude such that the torques exerted by the two bent axis axial piston units are compensated.

7. Hydrostatic transmission according to claim 1, characterized in that a mechanical coupling of the bent axis axial piston units in the dual yoke (20) is designed such that the motor is adjusted from a maximum to a minimum pivot angle when the pump is pivoted from a minimum to a maximum pivot angle.

8. Hydrostatic transmission according to claim 4, characterized in that a coupling of the adjustment of the bent axis axial piston units is designed such that the motor is adjusted from a maximum to a minimum pivot angle when the pump is pivoted from a minimum to a maximum pivot angle.

* * * * *